United States Patent
Norton et al.

(10) Patent No.: US 11,720,888 B2
(45) Date of Patent: Aug. 8, 2023

(54) DECENTRALIZED TITLE TRANSFER AND VALIDATION OF ASSETS

(71) Applicant: Borsetta Labs, LLC, Sheridan, WY (US)

(72) Inventors: Pamela Norton, Denver, CO (US); Eric Wallace, Hampton, VA (US)

(73) Assignee: Borsetta Labs, LLC, Sheridan, WY (US)

( * ) Notice: Subject to any disclaimer, the term of this patent is extended or adjusted under 35 U.S.C. 154(b) by 231 days.

(21) Appl. No.: 16/296,831

(22) Filed: Mar. 8, 2019

(65) Prior Publication Data

US 2019/0279204 A1 Sep. 12, 2019

Related U.S. Application Data

(60) Provisional application No. 62/640,340, filed on Mar. 8, 2018.

(51) Int. Cl.
*G06Q 20/38* (2012.01)
*G06Q 30/018* (2023.01)
(Continued)

(52) U.S. Cl.
CPC ..... *G06Q 20/3825* (2013.01); *G06Q 10/0833* (2013.01); *G06Q 20/389* (2013.01);
(Continued)

(58) Field of Classification Search
CPC ............... G06Q 20/3825; G06Q 50/18; G06Q 30/0203; G06Q 30/06; G06Q 20/12;
(Continued)

(56) References Cited

U.S. PATENT DOCUMENTS 10,068,228 B1 * 9/2018 Winklevoss ............ H04L 9/085
10,275,739 B2 * 4/2019 Hanis ................. G06Q 30/0185
(Continued)

FOREIGN PATENT DOCUMENTS

CN 107145022 A * 9/2017
WO WO-2018128539 A1 * 7/2018 ........... H04L 9/3236

OTHER PUBLICATIONS

Project Provenance Ltd., Blockchain: the Solution for Transparency in Product Supply Chains, Nov. 21, 2015, available at https://www.provenance.org/whitepaper, archived at http://web.archive.org/web/20151205065852/https://www.provenance.org/whitepaper, 23 pages. (Year: 2015).*

(Continued)

*Primary Examiner* — Neha Patel
*Assistant Examiner* — Jeffrey L Licitra
(74) *Attorney, Agent, or Firm* — Erise IP, P.A.

(57) ABSTRACT

Medium, method and system for a distributed ledger system for recording asset provenance and titling information. The distributed ledger may store information that can be used to tie a particular digital asset provenance tag to an associated asset such as a serial number or other identifying indicia. The digital asset provenance tag may further store information regarding the provenance of the asset in question, including the history of the production and previous ownership of the asset. Thus, a prospective purchaser of the asset can confirm that the asset is what it is purported to be and that the seller is actually the owner of the asset prior to purchase.

20 Claims, 4 Drawing Sheets

(51) Int. Cl.
*G06Q 10/0833* (2023.01)
*G06Q 50/28* (2012.01)
*G06Q 30/06* (2023.01)
*G06Q 10/0875* (2023.01)
H04L 9/06 (2006.01)
H04L 9/00 (2022.01)

(52) U.S. Cl.
CPC ....... *G06Q 20/3827* (2013.01); *G06Q 30/018* (2013.01); *G06Q 50/28* (2013.01); *G06Q 10/0875* (2013.01); *G06Q 30/06* (2013.01); *G06Q 2220/00* (2013.01); *H04L 9/006* (2013.01); *H04L 9/0637* (2013.01); *H04L 9/0643* (2013.01); *H04L 9/50* (2022.05)

(58) Field of Classification Search
CPC . G06Q 30/0185; H04L 9/0643; H04L 9/0637; H04L 2209/38; H04L 9/006; H04L 9/3239

See application file for complete search history.

(56) References Cited

U.S. PATENT DOCUMENTS

| | | | | |
|---|---|---|---|---|
| 10,361,869 | B2* | 7/2019 | Gorman | H04L 9/3263 |
| 10,469,250 | B2* | 11/2019 | Rady | H04L 9/0637 |
| 10,505,726 | B1* | 12/2019 | Andon | G06F 16/2457 |
| 10,523,443 | B1* | 12/2019 | Kleinman | H04L 63/0853 |
| 10,614,239 | B2* | 4/2020 | Jacques de Kadt | G06F 21/6227 |
| 10,713,727 | B1* | 7/2020 | Floyd | G06Q 50/26 |
| 10,726,388 | B2* | 7/2020 | Brodersen | G06F 16/27 |
| 10,733,615 | B2* | 8/2020 | Koh | G06F 16/51 |
| 10,817,829 | B2* | 10/2020 | Jacobson | H04L 9/0637 |
| 2016/0098723 | A1* | 4/2016 | Feeney | G06Q 20/065 705/75 |
| 2016/0300234 | A1* | 10/2016 | Moss-Pultz | G06Q 20/3825 |
| 2016/0358186 | A1 | 12/2016 | Radocchia et al. | |
| 2017/0262862 | A1* | 9/2017 | Aljawhari | G06F 16/242 |
| 2017/0324711 | A1* | 11/2017 | Feeney | H04L 9/3247 |
| 2017/0331896 | A1 | 11/2017 | Holloway et al. | |
| 2018/0096175 | A1* | 4/2018 | Schmeling | G06Q 10/08 |
| 2018/0108024 | A1* | 4/2018 | Greco | H04W 4/029 |
| 2018/0276600 | A1* | 9/2018 | Fuller | G06K 7/12 |
| 2018/0349968 | A1* | 12/2018 | O'Brien | G06Q 20/389 |
| 2020/0250683 | A1* | 8/2020 | Padmanabhan | G06F 16/953 |

OTHER PUBLICATIONS

Abeyratne, S.A. and Monfared, R.P., 2016. Blockchain ready manufacturing supply chain using distributed ledger. International Journal of Research in Engineering and Technology, 05(09), pp. 1-10 (12 pages). (Year: 2016).*

Masha McConaghy, et al., Visibility and Digital Art: Blockchain as Ownership Layer on the Internet, Strategic Change, 2017;26:461-470 (10 pages), available at https://onlinelibrary.wiley.com/doi/full/10.1002/jsc.2146. (Year: 2017).*

Salisbury, David. World's smallest spirals could guard against identity theft | News | Vanderbilt University. Jun. 2, 2015. https://news.vanderbilt.edu/2015/06/02/worlds-smallest-spirals-could-guard-against-identity-theft/. (Year: 2015).*

Li, Dingzeyu et al. AirCode: Unobtrusive Physical Tags for Digital Fabrication. ACM UIST 2017 Technical Papers. Aug. 7, 2017. https://arxiv.org/pdf/1707.05754.pdf (Year: 2017).*

Chen et al. Engineering Epitaxial-Nanospiral Metal Films Using Dynamic Oblique Angle Deposition. Cryst. Growth Des. 2013, 13, 5, 2075-2080. (Year: 2013).*

IP.com translation of CN107145022A a kind of stratiform spiral WS2 the application of two-dimension nano materials (Year: 2017).*

K. Toyoda, P. T. Mathiopoulos, I. Sasase and T. Ohtsuki, "A Novel Blockchain-Based Product Ownership Management System (POMS) for Anti-Counterfeits in the Post Supply Chain," in IEEE Access, vol. 5, pp. 17465-17477, 2017, doi: 10.1109/ACCESS.2017.2720760. (Year: 2017).*

PCT Patent Application PCT/US2019/021325 International Search Report and Written Opinion; dated Oct. 2, 2019.

PCT Patent Application PCT/US2019/021325 International Preliminary Report on Patentability; dated Sep. 17, 2020.

* cited by examiner

DECENTRALIZED TITLE TRANSFER AND VALIDATION OF ASSETS

RELATED APPLICATIONS

This non-provisional patent application claims priority benefit, with regard to all common subject matter, of earlier-filed U.S. Provisional Patent Application No. 62/640,340 filed Mar. 8, 2018 and entitled DECENTRALIZED TITLE TRANSFER AND VALIDATION OF LUXURY ASSETS. The identified earlier-filed provisional patent application is hereby incorporated by reference in its entirety into the present application.

BACKGROUND

1. Field

Embodiments of the invention generally relate to the validation and transfer of assets and, more particularly, to a distributed ledger system for recording asset provenance and titling information.

2. Related Art

Traditionally, parties wishing to transact in assets have faced challenges in verifying the authenticity of the assets in question as well as in ensuring that the selling party actually has a marketable title for the asset in question. The first problem might be illustrated by a street vendor selling counterfeit Rolex watches, while the latter is illustrated by a man on the street offering the Brooklyn Bridge for sale.

Conventional solutions require expensive due diligence at the time of the transaction, such as an appraisal of the asset and a title search to confirm that the seller can convey good title. However, such solutions are impractical for smaller, lower-value goods. Furthermore, counterfeit goods, even where genuine goods are comparatively inexpensive, can still result in significant losses. For example, consider a laptop charger that is defective and destroys an expensive laptop or a network card that steals sensitive data from an internal network. As such, there is a need for a scalable system which can practically verify the authenticity and provenance of any type of asset.

SUMMARY

Embodiments of the invention address the above-described need by providing for a distributed ledger system for recording asset provenance and titling information using distributed or decentralized ledger technology and/or pegged sidechains to store hashed metadata or data contracts, smart contracts or transactions associated with the trusted physical asset. In particular, in a first embodiment, the invention includes one or more non-transitory computer storage media storing computer-executable instructions that, when executed, perform a method of tracking a provenance of an asset in a block chain, the method comprising the steps of storing, in the block chain, a digital asset provenance tag comprising one or more asset identifying indicia corresponding to and uniquely identifying the asset, one or more items of asset authentication information corresponding to the asset and verifying a source of the asset, and one or more items of asset ownership history information identifying a chain of previous owners of the asset, conducting a transaction of the asset on the block chain to a new owner, wherein the step of conducting the transaction on the block chain updates the one or more items of asset ownership history information to add the new owner.

In a second embodiment, the invention includes a method for tracking a provenance of an asset in a block chain, the method comprising the steps of generating a digital asset provenance tag for the asset, storing the digital asset provenance tag on the block chain, adding to the digital asset provenance tag one or more asset identifying indicia corresponding to and uniquely identifying the asset, adding to the digital asset provenance tag one or more items of asset authentication information corresponding to the asset and verifying a source of the asset, adding to the digital asset provenance tag one or more items of asset ownership history information identifying a chain of one or more previous owners of the asset, recording, on the block chain, a transaction involving transferring the asset to a new owner, wherein the step of recording the transaction involving the asset causes the new owner to be added to the one or more items of asset ownership history.

In a third embodiment, the invention includes one or more non-transitory computer-readable media storing a block chain for tracking the provenance of assets comprising a plurality of digital asset provenance tags, each digital asset provenance tag comprising a unique asset tag serial number identifying the digital asset provenance tag, one or more asset identifying indicia corresponding to and uniquely identifying an asset, one or more items of asset authentication information corresponding to the asset and verifying a source of the asset, one or more items of asset ownership history information identifying a chain of one or more previous owners of the asset, one or more items of transaction information corresponding to a transfer of the asset from one of the previous owners of the asset to another of the previous owners of the asset.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention relate to the secure titling and transfer of assets. In particular, embodiments of the invention implement a scoring system via a protocol layer for verifying asset identity and provenance. It is an objective of the invention to communicate a level of trust in the title and the asset itself via transparency of the provenance of the asset. When a party acquires, or wishes to acquire, a title to an asset, that party generally wishes to have some level of assurance that the asset in question is what it purports to be. The authenticity of some assets may be self-evident; however, other goods may be subject to counterfeiting and knock-offs. Furthermore, even if an asset is genuine the party offering it for sale may not have the legal right to sell it. For example, there can be no doubt that the Brooklyn Bridge is genuine, but few people would accept an offer to buy it from a man on the street. However, ownership of other assets may not be immediately apparent.

As used herein, an asset is any form of property in which a party can have a proprietary interest. For example, physical goods, living things (plants and animals, etc.), real estate, contractual rights, intellectual property, data and other soft assets are all contemplated as being "assets" as the term is used herein. Assets may specifically include non-fungible "one-of-a kind" items such as works of art or other unique items. Furthermore, an asset may have any value, ranging from household and personal goods to capital goods and commercial real estate. Embodiments of the invention apply to any of these types of asset.

Broadly speaking and as used herein, a title is a party's proprietary right or rights to an asset. Titles may be obtained by purchase, descent, seizure or grant. For the purposes of this disclosure, the party holding title to an asset is recognized of ownership in that asset and has good and marketable title, free from encumbrances for that asset. Embodiments of the invention provide for trusted title assets whereby the provenance of the asset as well as the provenance of the title of the asset is securely recorded and available for inspection. The chain of trust ultimately runs to one or more trust anchors, widely known and trusted third parties such as governmental agencies and standards bodies who can vouch (directly or indirectly) for the authenticity of the asset.

As such, embodiments of the invention address the problem of secure titling and transfer of assets in two parts: first, each asset is associated with a digital asset provenance tag. This tag is described in greater detail below but, in short, the digital asset provenance tag records the history of the asset, from creation up to its current owner, in immutable form in a distributed ledger. This digital asset provenance tag is linked to the associated asset using one or more identifying indicia to prevent forgery. Thus, a purchaser can be assured that, for example, the iPhone they are purchasing second hand was actually originally made by Apple and not by an imitator. A customer can, by using embodiments of the invention, verify the provenance and chronological history of an asset prior to purchasing it (or at any time).

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Figure 1:
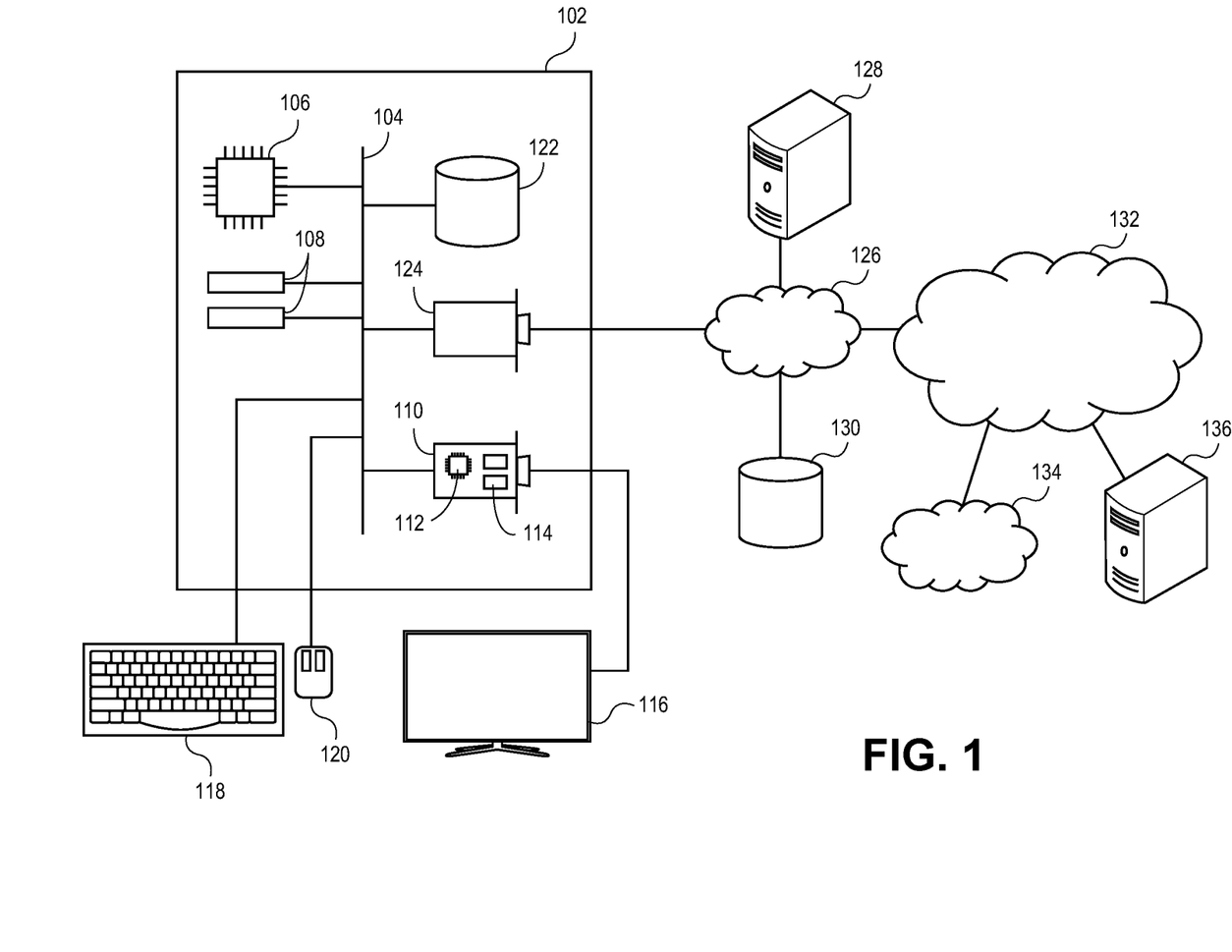
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and non-volatile media, removable and nonremovable media, and media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
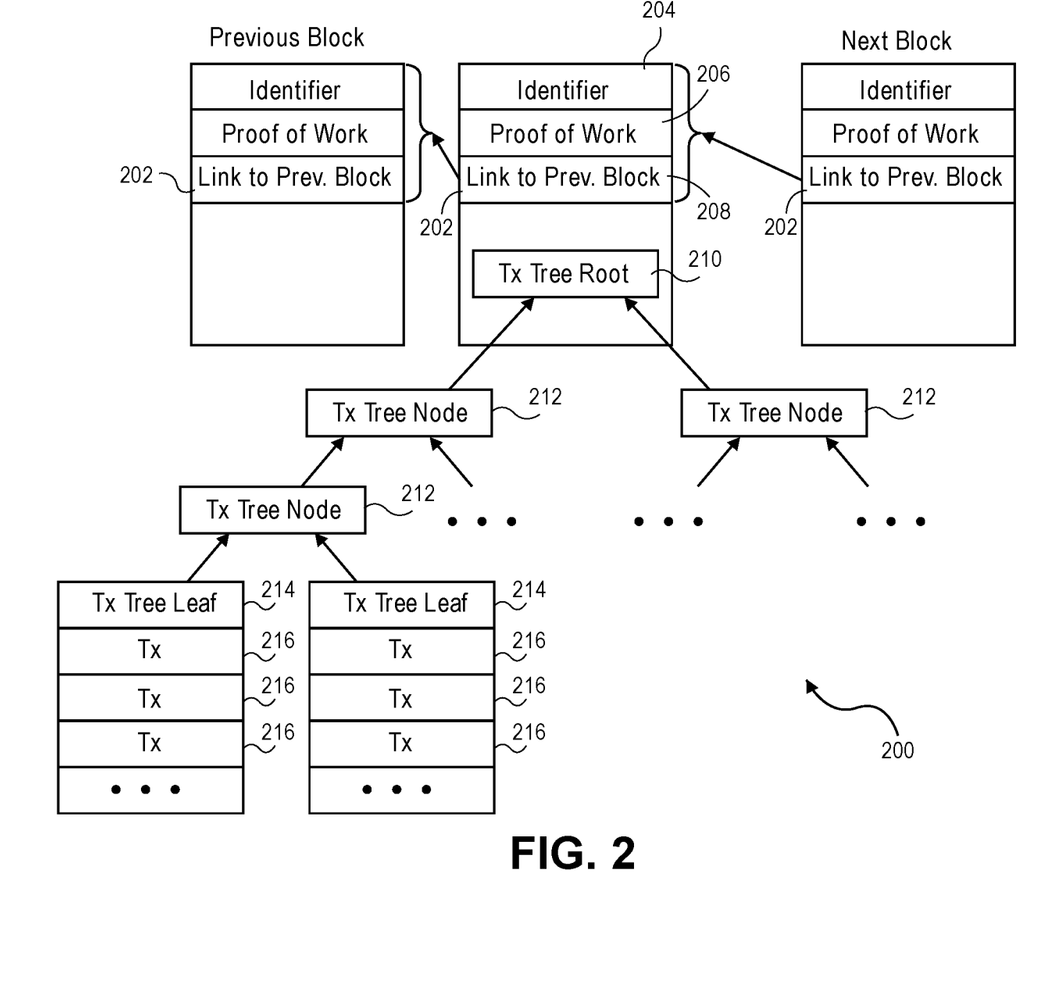
FIG. 2 depicts a representative block chain suitable for use with embodiments of the present invention.

Turning now to FIG. 2, a representative block chain suitable for use with embodiments of the present invention is depicted and referred to generally by reference numeral 200. Although a particular representative example of a block chain is depicted, it is contemplated that embodiments of the invention can operate with any distributed ledger technology, including the Ethereum block chain-based distributed computing platform, the Hedera Hashgraph platform, any form of Directed Acyclic Graph, or any other similar technology. For the sake of brevity, the term "block chain" is used herein; however, a person of skill in the art will appreciate that the techniques described herein can be implemented on top of other distributed ledgers as well.

Broadly speaking, block chain 200 is a distributed database that maintains a continuously updated record of transactions that cannot be altered or tampered with and comprises an ordered collection of blocks such as block 202. A computer (such as computer 102) in the distributed network (such as local network 126 or Internet 132) utilizing block chain 200 maintains a copy of each block 202 and can thus verify transactions in the block chain. Block 202, in turn, comprises elements ensuring the integrity of block chain 200 and transaction data making up the payload of block chain 200.

As depicted, the integrity elements of block 202 include identifier 204. In some embodiments, identifier 204 may be a serial number of other arbitrary unique value for identifying a particular block 202 of block chain 200 and determining block order without manually resorting block chain 200 based on other fields. In other embodiments, identifier 204 is a timestamp representing the time of creation of block 202. In still other embodiments, identifier 204 is integrated with or replaced by other fields of block 202. In yet other embodiments, identifier 204 may not be present.

Also included in block 202 is proof of work 206. A proof of work can be used to limit the rate at which block can be added to block chain 200 or to allow participants in the distributed network to compete to generate a new block to be added to the system. One type of proof of work is finding a preimage value which hashes to a given value under a predetermined hash function. Since hash functions are generally impossible to invert in better-than-brute-force time, participants in the block chain must hash random values until the desired value results. Other participants in the system can then easily verify that this preimage hashes to the correct value to verify that the work was performed. Because of the computation taken to generate the proof of work, no participant in the system can add excessive blocks to block chain 200.

The next component typically present in block chains such as block chain 200 is link 208, which establishes the order of blocks 202 making up block chain 200. As depicted, link 208 may be the hash of one or more header fields of the previous block. For example, the value for link 208 might be the hash of the concatenation of identifier 204 and proof-of-work 206 for the previous block 202. In this way, blocks 202 can be ordered, and it is generally impossible to create a block before its immediate predecessor has been published throughout the distributed system.

In addition to the integrity elements, block 202 includes transaction data 210 making up the payload of block chain 200. In this way, the integrity elements described above may be viewed as metadata associated with transaction data 210. In some embodiments, transaction data 210 may be included in block 202. In other embodiments, transaction data 210 is not stored directly in the block chain, but a summary or other verification (e.g., a hash) is stored in block chain 200 to allow externally stored transaction data to be verified using block chain 200.

In the particular embodiment depicted, block 202 stores as transaction data 210 the root of a Merkle tree. In such an embodiment, one or more transactions 216 are stored in each leaf node 214 of the Merkle tree. Each node 212 of the Merkle tree then stores the hash of the values stored in its child nodes 212, and only the root of the tree is stored in block 202. In this way, transactions can be verified in logarithmic time by tracing the path from the leaf node up to the Merkle root, which is in turn verified by block 202 of block chain 200. One of skill in the art will appreciate that many different variations and rearrangements of these components are possible under the broad concept of a block chain.

Ultimately, block chain 200 stores transactions 216 in a verifiable fashion. A transaction may ultimately be any type of data. For example, the Bitcoin block chain stores literal transactions (i.e., exchanges of digital currency). Other uses of block chains store other types of data as transactions. For example, the Ethereum chain can use the block chain as a distributed virtual machine with transactions variously representing code, state for the virtual machine, contracts, and digital currency exchanges. One of skill in the art will appreciate that any type of data may be stored in transaction 216, and that data so stored may be stored in publicly readable form or in in encrypted form depending on the use to which a particular block chain is being put.

Figure 3:
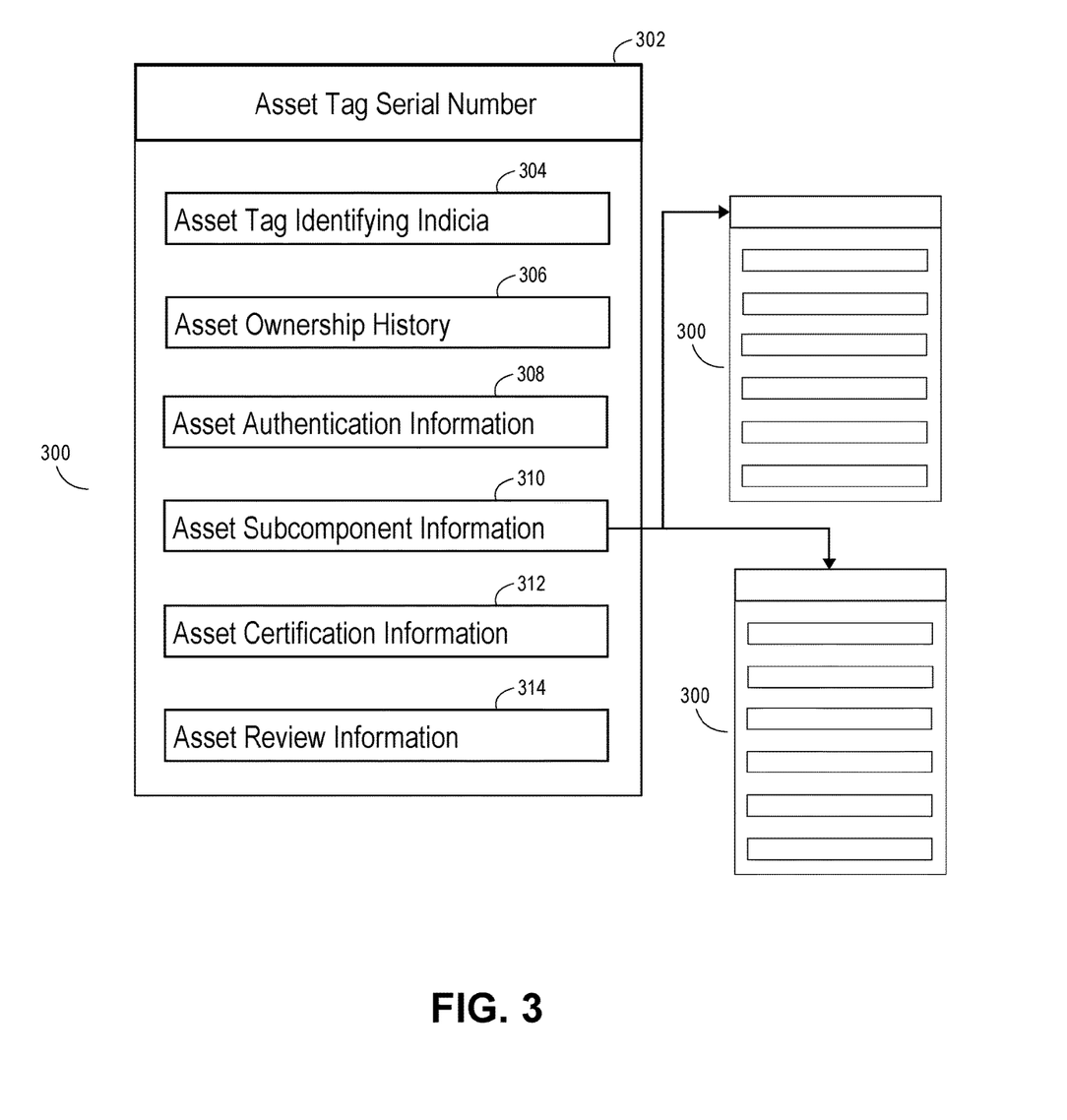
FIG. 3 depicts a schematic diagram depicting one example of a digital asset provenance tag.

Turning now to FIG. 3, a schematic diagram depicting one example of a digital asset provenance tag is depicted and referred to generally by reference numeral 300. Although, as depicted, digital asset provenance tag 300 is a single data structure, it is envisioned that digital asset provenance tag 300 may be broken up into a number of distinct records and distributed throughout a distributed ledger, as described in greater detail elsewhere. The depiction in FIG. 3 is schematic only and depicts an embodiment selected for ease of comprehension.

In particular, permissions may be enforced on the digital asset provenance tag to ensure integrity and privacy, and different elements of the digital asset provenance tag (as described below) may allow different permissions to different roles in the system. In some embodiments, permissions can be enforced by means of digital signatures. For example, at the time of creation of a digital asset provenance tag, a root permission may be added to the block in the form of a signing key signature. This key can then add additional write permissions by adding additional signature blocks with associated permissions and signing them. Similarly, read permissions can be implemented by encrypting read-restricted materials and publishing the decryption key into the block chain itself encrypted with the public key of the party or parties granted permission to read.

Different roles in the system may require (and be granted) different sets of permissions. For example, a manufacturer may require write permission on the asset identifying indicia and asset authentication information blocks. A user of the system, who owns title in one or more of the assets may have complete read permission over the digital asset tag in which they own title but lose those permissions when they transfer the title to another party. Where a digital asset provenance tag includes review information, any owner, past or present, may have write permission, and read permission may be generally available. An auditor may have universal read permissions but no write permissions in the system. A person of ordinary skill in the art will, upon reviewing this disclosure, understand how role-based access controls can be implemented as appropriate using the primitives discussed above.

Among other potential fields, digital asset provenance tag 300 includes tag serial number field 302. Broadly speaking, this tag serial number field can represent any unique characteristic, or other identifier/representation of the asset. In some embodiments, this field contains a globally unique serial number which uniquely identifies the asset in question. In another embodiment, a three-dimensional scan of a computer chip could be stored as the tag serial number for that chip. This field may be searched for or (as described below) referenced in other digital asset provenance tags. In some embodiments, this serial number is physically referenced in the asset assert being so tagged. For example, a microprocessor may have a processor ID embedded in the processor and accessible via machine code. Where digital asset provenance tag 300 is generated after the processor has been manufactured, for example, this processor ID can be used as the asset tag serial number as well. Alternatively, where asset tags are pregenerated or where a serial number of the asset is too short to be used as a globally unique asset tag serial number, the asset tag serial number may not have any semantics outside of the context of the blockchain storing the digital asset provenance tags. In still other embodiments, a digital wallet (e.g., one or more fungible tokens or other assets of value) can be embedded into the unique identifier.

Particularly in cases where the asset tag serial number 302 is not tied directly and immutably to the asset in question, the digital asset provenance tag may include one or more asset identifying indicia 304. Broadly speaking, each asset identifying indicium 304 serves to confirm that a given asset (such as, for example, a physical object in the real world) corresponds to digital asset provenance tag 300. In some embodiments, the identifiers on a physical object are tamper-proof and/or difficult to replicate or forge. In other embodiments, the identifiers on a physical object are easy to digitize and can be used to search for the digital asset provenance tag corresponding to a particular object. Thus, for example, a particular high-value asset might incorporate a radio-frequency identification (RFID) tag which can be easily scanned to locate the digital asset provenance tag corresponding to the asset as well as a nanospiral or other reproduction-proof identifier to ensure the authenticity of the object. Thus, while a fraudulent asset could clone the RFID tag associated with the asset, the reproduction-proof identifier ensures that the genuine asset can be authenticated securely while the fraudulent asset can be identified as fraudulent.

One family of techniques for creating reproduction-proof identifiers involves marking, modifying, or creating a random surface or subsurface pattern which can be measured. Particularly when such patterns are created at the nano-scale or in three dimensions, the ability to measure the pattern thus created exceeds the ability to accurately reproduce it. For example, a glass or transparent plastic tag may be created with a number of incorporated air bubbles or included imperfections. While these bubbles or imperfections can be visually or digitally compared to a stored record associated with a particular asset, it may be very difficult or impossible to replicate a known pattern. Thus, once generated and tied to a particular asset, it is impossible to replicate the identifier on a forged copy of the asset. Similarly, in another embodiment, a nanospiral can be used as the basis of a reproduction-proof identifier. In such embodiments, a nanospiral, having a shape and size such that when it absorbs infrared light it reflects visible light (e.g., blue), is embedded on or under the surface of the asset. This fluorescence may be second harmonic response, for instance forward second harmonic generation. In an embodiment, the nanospirals can be planar Archimedean nanospirals as described in Davidson et al, Efficient Forward Second-Harmonic Generation from Planar Archimedean Nanospirals, Nanophotonics 2015; 4:108-113, which is incorporated herein by reference. Other techniques for unique asset identification using reproduction-proof identifiers are also contemplated.

A person of skill in the art will appreciate that a variety of unique identifier markings exist, ranging from trivial to reproduce (such as a printed bar code or QR code), to difficult to reproduce (such as a hologram with an embedded serial number) to impossible or nearly impossible to reproduce (such as the embedded reproduction-proof identifiers described above). These identifiers may also vary in ease of verification. For example, a bar code can be digitized for verification using only a bar code reader or a digital camera, and a hologram can be verified using the naked eye, while a nanospiral may require specialized equipment to verify. As such, a particular asset may include multiple such identifiers for identification under circumstances where different levels of authentication are required. For example, a particular asset may have an RFID tag for inventory management purposes, but a high-security nanospiral for authentication when the asset is sold or otherwise transferred. Some asset identifying indicia may be encrypted and/or steganographically obscured (using, for example, visual cryptography).

Furthermore, multiple high-security identifiers may be included on an asset to further increase the difficulty of forging the asset. Records for each asset identifying indicium 304 are incorporated into digital asset provenance tag 300 to ensure that the provenance recorded actually corresponds to the asset being examined. A person of skill in the art will further appreciate that high value assets may warrant the use of higher-security identifiers or multiple such identifiers. In some embodiments, asset tag serial number 302 may be a hash of the various asset identifying indicia. In other embodiments, an item of asset identifying indicia may itself be a cryptographic hash of hidden information embedded in the asset.

Digital asset provenance tag 300 may further include asset ownership history information 306. Asset ownership history information 306 describes the life of the associated asset, beginning with its manufacturer, through the distributor and retail outlet, and including each owner. Thus, for example, where the asset is a car, asset ownership history information 306 may include the plant and date when the car was built, the dealership which originally sold the car, the original buyer, a second dealership who took the car as trade-in, and the current owner who purchased the car from the second dealership. In some embodiments, the asset ownership history information 306 makes use of the blockchain's append-only nature to ensure that ownership fraud (for example, selling a vehicle with a salvage title as having a clean title or selling the same asset twice to two different buyers) cannot be perpetrated. Furthermore, asset ownership history information 306 serves as proof of current ownership, because the current owner is simply the party at the end of the ownership history. This renders asset ownership history information 306 an effective record of title as well. In some embodiments, asset ownership history information 306 can further include metadata (or hashes of metadata) including documentation (e.g. photographs, past appraisals, receipts, and/or restoration records) information stored on the digital title by third-party validators to the trusted physical asset.

In some embodiments where permissions to write to digital asset provenance tag 300 are restricted, asset ownership history information 306 may also play a role in managing these permissions. For example, the last party in asset ownership history information 306 may be deemed the owner of record and, as such, the only party with permission to append to asset ownership history information 306. Similarly, the owner of record may be the only party able to authorize appending to subcomponent information 310 (for example, when the associated asset is repaired). In some embodiments, both the buyer and seller must authorize appending the buyer's name to asset ownership history information 306. For example, where digital signatures are employed in appending to asset ownership history information 306, this assures that the selling party is the same party that previously purchased the asset, as the same key will be used to sign the purchase transaction and the sale transaction.

In some embodiments, digital asset provenance tag further includes asset authentication information 308. While asset identifying indicia 304 serves to tie digital asset provenance tag 300 to the associated asset, asset authentication information 308 serves to verifiably confirm that the associated asset is, in fact, what it appears to be rather than a counterfeit. For example, lab-created diamonds are valuable and might have associated digital asset provenance tags. However, a consumer might value natural diamonds more highly, leading an unscrupulous seller to represent a lab-created diamond as natural. Asset authentication information 308 provides assurances up a chain of trust to an ultimate trust anchor that the asset is what it is purported to be.

For example, a particular diamond with a digital asset provenance tag might be certified by the cutter as a natural diamond via a digitally signed certification in asset authentication information 308. However, consumers may not be familiar with every reputable gem cutter in the world, and so an unscrupulous gem cutter could make false certifications. To prevent this, gem cutters may in turn be certified by a diamond cartel such as DeBeers to only provide natural diamonds. Then, in order to ensure that the certifying party is genuine, the trademark being certified may be signed by a governmental body as belonging to the certifying party. Thus, for example, the USPTO might certify that a certificate in the name of DeBeers is in fact registered to the same party that owns the DeBeers trademark. The DeBeers certificate in turn certifies that the gem cutter only cuts natural diamonds. Finally, the gem cutter's certificate certifies that the associated asset was actually cut by the gem cutter.

Similarly, a high-end handbag that purports to be a Louis Vuitton handbag may include a certification by LVMH in asset authentication information 308. This certification might itself include a certification by the trademark office that LVMH is the owner of the "Louis Vuitton" handbag and entitled to determine whether or not a Louis Vuitton handbag is genuine. Alternatively or in addition, the International Trade Commission and/or customs might certify upon import that a good has a traceable origin and complies with the trademark laws of the country into which it is being imported. In such a case, the ITC, itself a governmental body, would be the trust anchor. However, a trust anchor need not be a governmental body. For example, in the above example of a diamond, DeBeers might itself be a trust anchor for authenticating diamonds. Similarly, in the example below of repair shops, the Better Business Bureau might be a trust anchor for verifying that a particular certificate belongs to the repair shop it claims to be from. Alternatively or in addition, a brand could be the trust anchor for repair shops authorized for that brand.

In some embodiments, digital asset provenance tag may optionally include one or more subcomponent identifying information 310 records. Such records serve to link the associated asset with one or more subcomponents of the associated asset via digital asset provenance tag 300 and additional digital asset provenance tags associated with the subcomponents. Thus, subcomponent identifying information 310 could include asset tag serial numbers for each subcomponent of the asset as a whole. For example, a diamond ring might incorporate three valuable stones. However, mounting the stones might make it difficult to verify the identifying indicia of those stones. To address this issue, the ring itself can have a digital asset provenance tag 300 which incorporates the digital asset provenance tags for the stones. This incorporation can be done as simply as including the asset tag serial numbers of the stones in the subcomponent information portion of the digital asset provenance tag for the ring as a whole. Furthermore, a subcomponent can itself have subcomponents. For example, a computer may include a tracked motherboard asset as a subcomponent, which itself might include a BIOS, a northbridge, a southbridge and/or other element as subcomponents of its own. In some such embodiments, the subcomponents of the asset can be stored as a Merkle tree for easier verification.

As another example, a computer server may be assembled from a number of components including a motherboard, a power supply, a CPU, one or more RAM modules, a video card, a network card, and so forth. Many or all of these components may themselves be branded, expensive components that are subject to counterfeiting or replacement with security-compromised imitations. As such, these components may have digital asset provenance tags to ensure that they are genuine. The purpose of subcomponent information 310 is to unify all of these records into a single digital asset provenance tag. For example, it is frequently the case that such servers are sealed shut for warranty purposes. This would, however, prevent the consumer from opening the case to determine the asset tag serial numbers of the internal components and verify the asset identifying indicia for those subcomponents. By providing a digital asset provenance tag for the component as a whole, the manufacturer can certify the parts used in the device.

Another aspect of subcomponent identifying information 310 is repair information. For example, in the computer server described above, it might be the case that the network card fails after a period of use. In such a case, replacement would be required. However, replacement without updating subcomponent identifying information 310 would cause subcomponent information 310 to no longer reflect the history and components of the asset correctly. To prevent this, subcomponent information can include repair entries indicating which components were added, removed and/or replaced, the date and time of the work, and the repair shop that performed the work. In this way, the digital asset provenance tag 300 can assist in tracking the warranty of the associated asset be confirming that all repair work was performed by authorized personnel as well as verifying the install date of the various components, which may have warranties of their own. Furthermore, subcomponent identifying information 310 can also be used to verify the authenticity of the subcomponents. For example, it could be the case that some or all the parts in an auto, drone or device are recognized by a processor of that device master chip that has access to the subcomponent information 310. If a new part is introduced to the device (and therefore added to the subcomponent information 310) but not authorized, the device as a whole may reject that new component and refuse to operate.

Next, digital asset provenance tag 300 may include certification information 312 that includes one or more certifications as to the underlying asset. For example, a laptop might include certifications from the FCC (indicating that the radio-frequency emissions of the wireless network card comply with regulations), from Underwriters Laboratories certifying that the power supply complies with the standards for electrical and electronic safety and so forth. Similarly, a diamond may bear a Kimberly Process certificate indicating that it is a conflict-free diamond and a car might bear a certificate stating that it meets particular carbon emissions standards. Certification information 312 may also include licensing information. For example, the server above might include a Windows Server license and/or licenses or application software. By including this information in the digital asset provenance tag 300, licensing compliance can be simplified by ensuring that all servers are licensed for the appropriate software. Broadly, it is contemplated that any first-party or third-party certifications or licenses can be included in certification information 312.

Additionally, digital asset provenance tag 300 may include review information 314. Review information 314 may include any free-form or structured information added by a current or previous owner of the associated asset. For example, a consumer good may include a review of the product, made publicly searchable. In this way, prospective purchasers can find reviews of the product and have assurance that the reviews come from owners of the product with verified ownership histories. Thus, for example, a prospective purchaser may be able to search for reviews from parties who owned the product for at least a year. Similarly, a classic car may have historical information, maintenance information, or modification information added by current or past owners.

In some embodiments, the digital asset provenance tag may incorporate a physical component adjoined to, stored in proximity with, or otherwise physically associated with the asset. Such physical tags may include minimal functionality (such as being a simple RFID transponder) or may include a complete Internet-of-Things device complete with a processor, memory network transponder, and any other elements shown or described with respect to FIG. 1 (or not so shown or described). This physical tag may be able to autonomously transact, share provenance information, validation score, or other data with other machine processes, or Internet-of-Things devices, or other system components. Furthermore, this physical tag may include one or more sensors or transponders able to measure the physical environment (including health information, barometric pressure (and therefore altitude), temperature, dew point, humidity, condition of product, and location) of the asset and record it into the digital asset provenance tag. For example, a digital asset provenance tag with a corresponding physical asset tag embedded in the cork of a wine bottle could verify that the wine was stored properly throughout its life. A person of skill in the art will be able to immediately ascertain a significant number of practical applications of storing the physical history of an asset in an immutable digital ledger.

Figure 4:
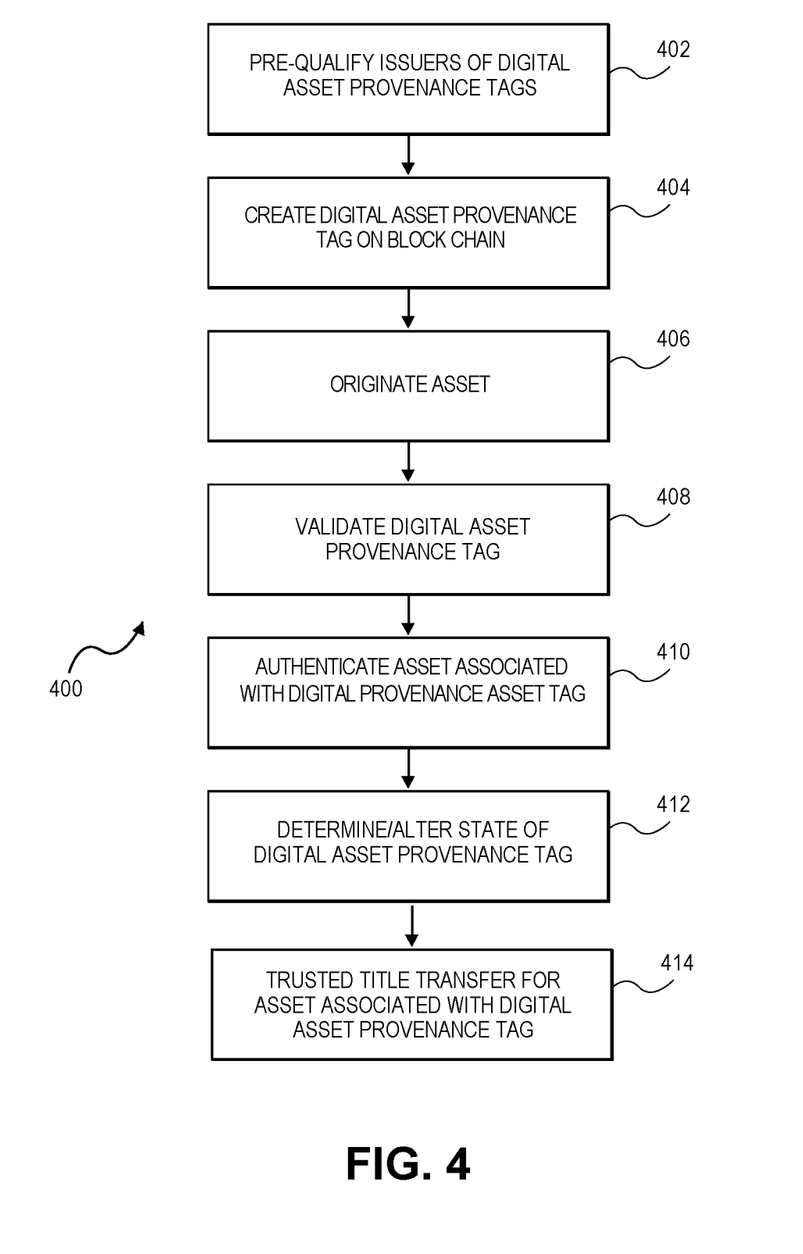
FIG. 4 depicts a flowchart illustrating a method illustrating the lifecycle of a digital asset provenance tag in accordance with another embodiment of the invention.

Turning now to FIG. 4, a flowchart illustrating a method illustrating the lifecycle of a digital asset provenance tag in accordance with another embodiment of the invention is depicted and referred to generally by reference numeral 400. Initially, at step 402, issuers of digital asset provenance tags are pre-qualified. As described above, the issuers of digital provenance asset tags for verifying the provenance of an asset ultimately derive their authority from one or more trust anchors who are recognized as being trustworthy. At this step, the issuing party establishes a chain of trust that grants them authority to issue certain tags.

For example, a consumer electronics company such as Apple might have a first certificate with which they can sign a digital asset provenance tag to verify that the associated asset is a genuine Apple product, and a second certificate with which they can sign the digital asset provenance tag to verify that the associated asset is an iPhone. In some embodiments, these certificates may themselves be signed by the trust anchor (such as, for example, the local trademark authority to verify that the certificate belongs to the holder of the corresponding trademark). In other embodiments, the certificates may be signed by an intermediary party with a certificate that itself is signed by the trust anchor (or by another intermediary party that can ultimately derive authority from the trust anchor). In still other embodiments, the prequalifying party can provide evidence of the authority (such as, in the example above, a copy of the trademark registration) to an independent certifying party without independent authority (such as the administrator of the blockchain or another certificate authority). In yet other embodiments, a web-of-trust model may be used where any party who trusts the holder of a certificate may sign the certificate and user can determine whether to trust the certificate based on those signatures.

Next, at step 404, a unique digital asset provenance tag (such as digital asset provenance tag 300) is created on the block chain (such as block chain 200). In some embodiments, this digital tag is created before the asset is manufactured. For example, a manufacturer who has passed a prequalification process may be granted a block of blank digital provenance asset tags which they can populate as the assets are manufactured. In other embodiments, digital provenance asset tags may be created to verify the provenance of an existing asset.

Upon creation of the digital asset provenance tag, some or all of the elements may be populated. For example, the asset tag serial number will typically be populated in order to add the digital asset provenance tag to the blockchain. However, in some embodiments, a serial number may be reserved for the digital asset provenance tag, but the tag itself may not be created until the asset is manufactured. In still other embodiments, a smart contract on the block chain (or any other pointer) may grant the manufacturer (or other verifier) the right to create one or more digital asset provenance tags.

Next, at step 406, the asset is originated. In some embodiments, or for some assets, this may be the point of manufacture of the asset. For other assets, this may be when an existing asset is entered into the blockchain. In some embodiments, the asset identifying indicia are created and/or recorded into the digital asset provenance tag at this step. In some embodiments, a level of required security is determined (for example, based on the estimated value of the asset) and the appropriate marker or markers determined based on the required level of security. For example, a consumer electronic device might have a serial number assigned at the time of manufacture, which can be recorded into the digital asset provenance tag at this step. Alternatively or in addition, a reproduction-proof identifier might be added to the asset at the time of manufacture, which can be measured and recorded into the digital asset provenance tag. Similarly, if the asset is being assembled from subcomponents as a part of the manufacturing process, the subcomponent identifying information can be added to the digital asset provenance tag at this step as well.

In other embodiments, such as where the asset is a preexisting asset for which a digital asset provenance tag is being created for the first time, the provenance of the asset must be determined and verified by a party which can attest to the accuracy of the provenance at this step. For example, if the asset is a historical work of art such as a painting, an appraiser might examine the asset and be willing to attest to its authenticity. In such cases, the current owner of the asset may be added to the asset ownership history portion of the asset provenance history tag. In some embodiments, previous owners (where known) can also be added to the ownership history information to more fully populate the record. In some embodiments such retroactively populated information may be marked as unauthenticated or otherwise distinguished from block chain-authenticated transactions.

Next, at a step 408, the digital asset provenance tag may be validated. This validation may occur at any point in the life cycle of the digital asset provenance tag and the associated asset and can happen based on a scan of the asset or based on the digital asset provenance tag itself. During this process, all of the chains of trust from the certificate up to the trust anchors are validated. For example, in order to validate the digital asset provenance tag associated with an iPhone, the various signatures in the asset authentication information block can be validated and the associated certificates checked against certificate revocation lists. As a part of the smart contract associated with issuing the digital asset provenance tag, the manufacturer may have indicated that certain identifying indicia would be included in each issued digital asset provenance tag. Any such requirements in the smart contract can be checked as a part of this validation process. The validation process of step 408 can thus be viewed as an integrity check for the digital provenance asset tag to ensure that it was issued in accordance with the requirements set out in the associated contract and that all of the signatures remain valid.

Next, at step 410, the authenticity of the asset associated with the digital asset provenance tag can be scored. As with step 408, this process can be carried out at any point in the lifetime of the associated asset, such as immediately prior to a purchase or sale of the asset. In some embodiment, the digital asset provenance tag is validated (as in step 408) before the asset authenticity is scored. To authenticate an asset, two links must be validated: first, the link between the trust anchors and the digital asset provenance tag and second, the link between the digital asset provenance tag and the asset itself.

For the first link, both what the trust anchors claim about the asset and the trust anchors themselves may be evaluated. For example, a digital asset provenance tag for an iPhone signed by Apple using a certificate itself signed by the USPTO would be considered a highly trustworthy tag. A digital asset provenance tag for a piece of art signed by an appraiser would be considered as trustworthy as the appraiser (for example a highly reputable appraiser certified by Sotheby's would generate more trustworthy tags than a self-certified art gallery owner). Additional certifications from additional trust anchors may increase the trustworthiness of the digital asset provenance tag in proportion to the trustworthiness of the corresponding trust anchors. For example, in some embodiments, the trust score of a digital asset provenance tag may be the highest score along any path from the digital asset provenance tag to a trust anchor. In other embodiments, scores from different paths from the digital asset provenance tag to various trust anchors may be added or otherwise aggregated.

For the second link, the various asset identifying indicia are similarly evaluated. The trustworthiness of the link between the digital provenance asset tag and the associated asset depends on both the identifying indicia matching and on the difficulty of forging the indicium on the asset. For example, a printed serial number would provide a fairly low trust score because of the ease in forging it. On the other hand, an embedded nanospiral or other reproduction-proof identifying indicium would provide a higher trust score. As in the case of trust anchors, adding multiple identifying indicia can increase the confidence that the asset is in fact associated with the digital asset provenance tag. However, in some embodiments, if a single identifying indicium does not match the information in the digital asset provenance tag, this disparity may reduce the trust score more than if the corresponding indicium were absent from the asset and the tag completely.

The score for the trustworthiness of the digital asset provenance tag and the score for the link between the digital asset provenance tag and the associated asset may then be combined to determine the final score for the authenticity of the asset. For example, if the two scores are scaled similarly, then the minimum of the two scores may be the resultant overall trust score. Alternatively, the scores may be expressed as fractions of a maximum value and multiplied together to determine the overall trust score. Other techniques for aggregating the two subscores into an overall trust score are also contemplated, as are methods of directly calculating an overall trust score without first calculating the intermediate scores.

Next, at a step 412, the state of the digital asset provenance tag may be determined and/or altered. In some embodiments, the state of the digital asset provenance tag may be stored in a field of the digital asset provenance tag itself with changes appended to that field whenever they occur. In other embodiments, the state of the asset may be a function of the block chain itself. For example, where assets are stored in digital wallets, an asset in an escrow state may be transferred from the original owner's digital wallet to a special escrow wallet. Various embodiment of the invention may include various number of asset states to facilitate different types of transactions. Thus, for example, when a digital asset provenance tag has been created on the block chain in anticipation of an asset being created, it may be in an "origination" state. Once the associated asset has been created, it may move into a "provenance" state where its provenance is being established and/or validated. Once the initial digital asset provenance tag has been created and entered onto the block chain, it may enter into a default "ownership" state.

An asset may then move between a variety of states over the course of the lifecycle of the asset. As described above, a digital provenance asset tag may move into an "escrow" state between "ownership" states while the transfer of funds (or other assets) is verified. In some embodiments, while the digital asset provenance tag is undergoing validation, it may enter a "trust anchor validation" state. Various other embodiments may include a variety of other states to address various ownership transfer scenarios. For example, embodiments may include "arbitration," "custodianship," "seizure" states. Finally, in some embodiments, a "destroyed" state may exist to indicate that the asset has reached the end of its lifecycle so that the identity of a destroyed item cannot be repurposed for a forgery.

Finally, at a step 414, the asset can undergo a trusted title transfer as facilitated by the digital asset provenance tag. Broadly speaking, embodiments of the invention contemplate using features provided by the underlying block chain, such as atomic transactions and double-spend prevention techniques to facilitate trusted title transfer. As described above, the digital asset provenance tag includes an asset ownership history block. As such, some embodiments may effect a title transfer by appending a new owner to the asset ownership history block. This update can then be propagated in the block chain to reflect the updated ownership. In some embodiments, the title remains on the block chain throughout its life cycle. In other embodiments, the title can be transferred to a digital wallet, cold storage wallet or can be managed by a third-party custodian. Such data storage can include the digital asset provenance tag itself and/or any other attached data. For example, the transaction of a trusted physical asset might involve (1) the seller scanning the trusted physical asset, (2) the buyer verifying funds available, and (3) the transaction taking place on a distributed ledger technology via smart contract value (or data contract value or other exchange of value).

As used herein, the transfer of an asset can include transferring an asset to another asset (for example, adding it as a subcomponent), or transferring as asset to a new owner, and can be based on an exchange of an asset for some form of currency (whether fiat or digital), an asset for a different asset, or an asset for a subcomponent of an asset. Furthermore, the consideration for the asset may be on the block chain (for example, another asset or a digital currency token) via an atomic token swap, off the block chain (for example, via a conventional point-of-sale, a mobile payment, digital money, or an EMV payment, or a combination of these. Still further, any or all of these forms of consideration can be transferred by any client-to-server, peer-to-peer, business-to-business protocol, or by a dedicated layer 2 protocol specifically for facilitating transactions. For example, one such protocol envisioned incorporates multi-chain interoperability to allow independent block chains, distributed and decentralized ledgers to transact, swap, exchange, share, loan, and or fractionalize trusted physical assets with crypto/digital currencies, asset-backed tokens and/or pegged fiat currencies.

In some embodiments of the invention, the block chain platform further incorporates a second type of token in addition to the asset token discussed above in order to facilitate transactions. Such tokens may be referred to as utility tokens or currency tokens and encompass any indicia of value on a block chain (which may be the same block chain as discussed above or separate block chains). In such embodiments, parties may use these currency tokens to pay for asset services on the block chain (such as originating an asset, verifying an asset, or conducting a transaction of an asset) as well as exchange them for trusted title assets on the block chain. In some such embodiments, the digital asset provenance tag may include one or more such currency tokens as a field. These embedded value tokens can be used to pay for verification of or transactions involving the asset without requiring the counterparty to pay additional funds. Unlike the block tokens corresponding to the digital asset provenance tags, these tokens may be fungible (i.e., divisible). By contrast, the non-fungible block tokens (because they correspond to the provenance tag representing a unique asset) cannot be subdivided and must be bought or sold whole. Instead, the non-fungible block tokens offer unique characteristics which make them different from and more digitally scarce than a fungible token. They can be compared to baseball cards, as each has unique information and varying levels of rarity. In some embodiments, these fungible tokens are tied to the associated asset (or to particular uses associated with the underlying asset) via the use of a smart contract and/or data contract. These embedded value tokens can be used to pay for verification of or transactions involving the asset without requiring the counterparty to pay additional funds. Unlike the tokens corresponding to the digital asset provenance tags, these tokens may be fungible (i.e., divisible). By contrast, the non-fungible tokens, which (because they correspond to the provenance tag representing a unique asset) cannot be subdivided and must be bought or sold whole. Instead, the non-fungible tokens offer unique characteristics which make them different and digitally scarce than a fungible token. They can be compared to baseball cards, as each has unique information and varying levels of rarity. In some embodiments, these fungible tokens are tied to the associated asset (or to particular uses associated with the underlying asset) via the use or a smart contract and/or data contract.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer storage media storing computer-executable instructions that, when executed, perform a method of tracking provenance of a physical asset, the method comprising:
receiving from an issuer, a signing signature key and a first measurement of a nano-scale pattern;
generating a digital asset provenance tag stored in a block of a blockchain by adding to the block the signing key signature, wherein the digital asset provenance tag comprises:
an asset tag serial number field including a cryptographic hash corresponding to the physical asset,
an asset identifying indicium containing a measurement of the nano-scale pattern uniquely identifying the physical asset, wherein the measurement comprises data reflected by the nano-scale pattern, and wherein the data reflected by the nano-scale pattern comprises one of: (i) a nano-spiral configured to absorb infrared light and reflect visible light, the visible light comprising a second harmonic response, or (ii) a transparent tag comprising incorporated air bubbles or included imperfections;
an asset ownership history information field including a record of digital signatures for each owner of the physical asset,
an asset authentication information field including a digitally signed certificate signed by a trust anchor of the physical asset,
wherein the trust anchor is a verified source of the physical asset, and
an asset subcomponent information field containing asset tag serials numbers of subcomponent physical assets associated with the physical asset,
recording to the digital asset provenance tag on the blockchain, the first measurement of the nano-scale pattern, the first measurement of the nano-scale pattern, uniquely associating the physical asset with the digital asset provenance tag;
receiving, from a third-party validator, a second measurement of the nano-scale pattern, and determining a match between the second measurement of the nano-scale pattern and the first measurement of the nano-scale pattern;
authenticating the physical asset based on (i) the digital asset provenance tag having been validated and (ii) the match between the second measurement of the nano-scale pattern and the first measurement of the nano-scale pattern; and
in response to validating the digital asset provenance tag, conducting a transaction on the blockchain, the transaction comprising recording to the digital asset provenance tag on the blockchain an update to physical asset ownership history information stored in the digital asset provenance tag on the blockchain the update indicating a new owner of the physical asset.

2. The media of claim 1, wherein authenticating the physical asset comprises determining a trust score based at least in part on at least one of: the nano-scale pattern, a link between the digital asset provenance tag and the physical asset, or a path from the digital asset provenance tag to the trust anchor.

3. The media of claim 1, wherein the computer-executable instructions, the method further comprising:
recording to the digital asset provenance tag on the blockchain, at least one subcomponent-indicia associating the digital asset provenance tag with a subcomponent-digital asset provenance tag stored on the blockchain, the subcomponent-digital asset provenance tag uniquely associated with a subcomponent of the physical asset;
validating the subcomponent-digital asset provenance tag based on comparing subcomponent information stored in the subcomponent-digital asset provenance tag to at least one subcomponent-digital certificate and/or at least one subcomponent-smart contract associated with the subcomponent-digital asset provenance tag; and
authenticating the subcomponent based on the digital asset provenance tag having been validated and a subcomponent-trust score based on at least one of: a link between the subcomponent-digital asset provenance tag and the subcomponent, or a path from the subcomponent-digital asset provenance tag to one or more of the trust anchor.

4. The media of claim 1, wherein the digital asset provenance tag comprises at least one utility token or currency token useable to pay for the transaction on the blockchain.

5. A method of tracking provenance of a physical asset, the method comprising:
generating a digital asset provenance tag stored in a block on a blockchain, by adding to the block a signing key signature, and wherein the digital asset provenance tag comprises:
an asset tag serial number field containing a cryptographic hash corresponding to the physical asset,
an asset identifying indicium containing a measurement of a nano-scale pattern uniquely identifying the physical asset,
an asset ownership history information field containing a record of digital signatures for each owner of the physical asset,
an asset authentication information field containing a digitally signed certificate signed by a trust anchor of the physical asset,
wherein the trust anchor is verified source of the physical asset, and
an asset subcomponent information field containing asset tag serials numbers of subcomponent physical assets associated with the physical asset,
receiving the measurement of the nano-scale pattern, wherein the nano-scale pattern uniquely identifies the physical asset, and wherein the measurement comprises data reflected by the nano-scale pattern, and wherein the data reflected by the nano-scale pattern comprises one of:
(i) a nano-spiral configured to absorb infrared light and reflect visible light, the visible light comprising a second harmonic response, or (ii) a transparent tag comprising incorporated air bubbles or included imperfections;
recording the measurement to the asset identifying indicium of the digital asset provenance tag;
validating the digital asset provenance tag on the blockchain, a validation of the digital asset provenance tag comprising:

determining a digital signature in the asset authentication information field corresponds to a digital signature on at least one digital certificate and/or at least one smart contract, the at least one digital certificate and/or the at least one smart contract associating the digital signature in the asset authentication information field with the trust anchor in response to validating the digital asset provenance tag, recording a transaction on the blockchain, the transaction comprising recording transfer of the physical asset to a new owner, wherein recording the transaction comprises updating asset ownership history information by appending the digital signature of the new owner to indicate the new owner of the physical asset.

6. The method of claim 5, further comprising:

recording to the digital asset provenance asset tag on the blockchain, at least one subcomponent-indicia associating the digital asset provenance tag with a subcomponent-digital asset provenance tag stored on the blockchain, the subcomponent-digital asset provenance tag associated with a subcomponent of the physical asset;

validating the subcomponent-digital asset provenance tag based on a comparison of the subcomponent-digital asset provenance tag to at least one subcomponent digital certificate and/or at least one subcomponent smart contract associated with the subcomponent-digital asset provenance tag; and authenticating the subcomponent based on a subcomponent-trust score, the subcomponent-trust score comprising at least one of: a link between the subcomponent-digital asset provenance tag and the subcomponent, or a path from the subcomponent-digital asset provenance tag to at least one of the trust anchor.

7. A distributed ledger system for tracking provenance of at least one physical asset, the distributed ledger system comprising:

a plurality of computers respectively comprising one or more non-transitory computer-readable media, the one or more non-transitory computer-readable media respectively storing one or more blocks and computer-executable instructions, the one or more blocks corresponding to respective ones of the plurality of computers collectively defining a blockchain, and at least one processor executing the computer executable instructions to:

generate at least one digital asset provenance tag stored in the one or more blocks on the blockchain by adding a signing key signature, wherein the at least one digital asset provenance tag comprises:

an asset tag serial number field containing a cryptographic hash corresponding to a physical asset;

an asset identifying indicium containing a measurement of a nano-scale pattern uniquely identifying the physical asset, an asset ownership history information field containing a record of digital signatures for each owner of the physical asset;

asset authentication information field containing a digitally signed certificate signed by a trust anchor of the physical asset, wherein the trust anchor is verified source of the physical asset, and asset subcomponent information field containing asset tag serials numbers of subcomponent physical assets associated with the physical asset;

wherein the computer-executable instructions are further executed by the at least one processor to perform a method of tracking the provenance of the physical asset, the method comprising:

receiving the measurement of the nano-scale pattern, wherein the nano-scale pattern uniquely identifies the physical asset, and wherein the measurement comprises data reflected by the nano-scale pattern, and wherein the data reflected by the nano-scale pattern comprises one of: (i) a nano-spiral configured to absorb infrared light and reflect visible light, the visible light comprising a second harmonic response, or (ii) a transparent tag comprising incorporated air bubbles or included imperfections;

recording the measurement to the asset identifying indicium of the digital asset provenance tag;

validating the digital asset provenance tag on the blockchain, a validation of the digital asset provenance tag comprising:

determining a digital signature in the asset authentication information field corresponds to a digital signature on at least one digital certificate and/or at least one smart contract, the at least one digital certificate and/or the at least one smart contract associating the digital signature in the asset authentication information field with the trust anchor; and in response to validating the digital asset provenance tag, recording a transaction on the blockchain, the transaction comprising recording transfer of the physical asset to a new owner, wherein recording the transaction comprises updating asset ownership history information by appending the digital signature of the new owner to indicate the new owner of the physical asset.

8. The distributed ledger system of claim 7, wherein the blockchain comprises:

at least one subcomponent-digital asset provenance tag associated with a subcomponent of the physical asset;

wherein the at least one digital asset provenance tag respectively comprises:

a subcomponent validation of the respective subcomponent-digital asset provenance tag based on a comparison of information stored in the respective subcomponent-digital asset provenance tag to at least one subcomponent digital certificate and/or at least one subcomponent smart contract associated with the respective subcomponent-digital asset provenance tag; and a subcomponent-trust score, the subcomponent-trust score comprising at least one of: a link between the respective subcomponent-digital asset provenance tag and the subcomponent, or a path from the respective subcomponent-digital asset provenance tag to at least one of the trust anchor.

9. The media of claim 1, the method further comprising:

generating the digital asset provenance tag on the blockchain; and adding additional write permissions by adding additional signature blocks with associated permissions.

10. The media of claim 9, wherein the issuer operates a manufacturing process for the physical asset, and wherein the nano-scale pattern is embedded under a surface of the physical asset during the manufacturing process.

11. The media of claim 10, wherein the trust anchor comprises a certifying party, and wherein at least one digital certificate comprises a certification from the certifying party with respect to at least one of: the issuer, or the physical asset.

12. The method of claim 5, wherein the nano-scale pattern comprises a planar Archimedean nano-spiral.

13. The method of claim 6, further comprising:
conducting an additional transaction on the blockchain, the additional transaction comprising recording to the subcomponent-digital asset provenance tag on the blockchain an update to ownership history information stored in the subcomponent-digital asset provenance tag on the blockchain, the update reflecting a transfer of the subcomponent to a manufacturer of the physical asset.

14. The method of claim 13, wherein the trust anchor comprises a supplier of the subcomponent.

15. The method of claim 14, wherein the trust anchor comprises a certifying party, and wherein the at least one digital certificate comprises a certification from the certifying party with respect to at least one of: the physical asset or the subcomponent.

16. The distributed ledger system of claim 7, wherein the trust anchor comprises a certifying party, and wherein the at least one digital certificate comprises a certification from the certifying party with respect to at least one of: an issuer, or the physical asset.

17. The distributed ledger system of claim 8, wherein the trust anchor comprises a supplier of the subcomponent.

18. The distributed ledger system of claim 17, wherein the trust anchor comprises a certifying party, and wherein the at least one digital certificate comprises a certification from the certifying party with respect to at least one of: the physical asset or the subcomponent.

19. The method of claim 1, wherein the nano-scale pattern comprises a planar Archimedean nano-spiral.

20. The method of claim 1, wherein the physical asset comprises a plurality of nano-scale patterns each indicative of a separate and distinct security level.

* * * * *